United States Patent
Krebs et al.

(10) Patent No.: US 10,351,116 B2
(45) Date of Patent: Jul. 16, 2019

(54) PNEUMATIC BRAKE BOOSTER

(71) Applicant: Continental Teves AG & Co. oHG, Frankfurt (DE)

(72) Inventors: Stephan Krebs, Eschborn (DE); Harald König, Ober-Mörlen (DE); Alexander Schubert, Waldems (DE); Ingolf Buchholz, Butzbach/Griedel (DE); Thorsten Neu, Runkel (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 7 days.

(21) Appl. No.: 15/426,211

(22) Filed: Feb. 7, 2017

(65) Prior Publication Data

US 2017/0144641 A1 May 25, 2017

Related U.S. Application Data

(63) Continuation of application No. PCT/EP2015/068217, filed on Aug. 6, 2015.

(30) Foreign Application Priority Data

Aug. 7, 2014 (DE) .................. 10 2014 215 697

(51) Int. Cl.
*B60T 13/57* (2006.01)
*B60T 13/575* (2006.01)
(Continued)

(52) U.S. Cl.
CPC .............. *B60T 13/57* (2013.01); *B60T 13/52* (2013.01); *B60T 13/569* (2013.01); *B60T 13/575* (2013.01)

(58) Field of Classification Search
CPC ........ B60T 13/52; B60T 13/569; B60T 13/57; B60T 13/575
See application file for complete search history.

(56) References Cited

U.S. PATENT DOCUMENTS 5,257,572 A * 11/1993 Jakobi ................. B60T 13/57
91/376 R
6,422,124 B1 7/2002 Schonlau et al.
(Continued)

FOREIGN PATENT DOCUMENTS

EP 1479583 A1 11/2004
KR 19980027877 U 8/1998
(Continued)

OTHER PUBLICATIONS

International Search Report and Written Opinion dated Nov. 17, 2015 from corresponding International Patent Application No. PCT/EP2015/068217.
(Continued)

*Primary Examiner* — Thomas E Lazo

(57) ABSTRACT

A pneumatic brake booster for motor vehicles, comprises a booster housing, the interior of which is separated into a working chamber and a low-pressure chamber by an axially movable wall that can be supplied with a pneumatic differential pressure; a control housing; and a control valve which controls a differential pressure between the working chamber and the low-pressure chamber. The control valve controls an airflow between the working chamber and the low-pressure chamber or a surrounding atmosphere. The control valve has a plate valve and a valve piston, a seal region of which can be sealingly placed on the plate valve and which can be moved in a stroke direction R. A fine and low-noise metering of the brake force is achieved by providing a throttle point between the valve piston and the plate valve for throttling the airflow dependent on the stroke.

7 Claims, 3 Drawing Sheets

(51) Int. Cl.
B60T 13/52 (2006.01)
B60T 13/569 (2006.01)

(56) References Cited

U.S. PATENT DOCUMENTS

| | | | |
|---|---|---|---|
| 6,672,198 B2 * | 1/2004 | Friedsam | B60T 8/3275 |
| | | | 91/367 |
| 6,705,200 B2 * | 3/2004 | Schluter | B60T 8/3275 |
| | | | 91/367 |
| 7,032,498 B2 * | 4/2006 | Richard | B60T 13/57 |
| | | | 91/376 R |
| 9,027,340 B2 * | 5/2015 | Friedsam | B60T 13/57 |
| | | | 60/547.2 |
| 9,045,124 B2 * | 6/2015 | Hattori | B60T 13/57 |
| 9,260,097 B2 * | 2/2016 | Calvo Martinez | B60T 13/57 |
| 9,446,751 B2 * | 9/2016 | Frey | B60T 13/563 |
| 2014/0182987 A1 | 7/2014 | Yoshizawa | |

FOREIGN PATENT DOCUMENTS

| | | |
|---|---|---|
| KR | 20000002272 U | 1/2000 |
| KR | 20030024093 A | 3/2003 |
| KR | 20120029078 A | 3/2012 |
| KR | 20120030216 A | 3/2012 |
| WO | 99/26826 A2 | 6/1999 |

OTHER PUBLICATIONS

Korean Office Action dated Apr. 19, 2018 for corresponding German Patent Application No. 10-2017-7003297.

* cited by examiner

PNEUMATIC BRAKE BOOSTER

CROSS REFERENCE TO RELATED APPLICATIONS

This U.S. patent application claims the benefit of PCT patent application No. PCT/EP2015/068217, filed Aug. 6, 2015, which claims the benefit of German patent application No. 10 2014 215 697.1, filed Aug. 7, 2014, both of which are hereby incorporated by reference.

TECHNICAL FIELD

The invention relates to a pneumatic brake booster for a motor vehicle hydraulic brake system having a control valve for controlling a pressure differential between a working chamber and a vacuum chamber.

BACKGROUND

With the known configurations, a so-called over-modulation of the brake booster can occasionally occur, particularly with slow and normal brake actuations at the start of braking, when excessive quantities of air are suddenly exchanged between the working chamber and the vacuum chamber.

Such an effect can cause sometimes loud plopping noises, which in brake booster applications with a high vacuum>850 mbar are perceived as particularly unpleasant. This attracts criticism from automobile manufacturers now that vehicle interiors are becoming ever quieter.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY OF THE INVENTION

Arranging a restrictor between the valve piston and the disk valve of the control valve makes it possible to restrict the air flow as a function of the opening lift of the valve piston at small degrees of lift, whilst still providing sufficient dynamics to achieve the necessary pressure gradients at large degrees of lift.

The result is not only an improved noise behavior but also a distinct improvement in the control accuracy in slow and normal braking, because the air flow through the control valve can be more precisely regulated than hitherto in the critical initial phase of a braking operation.

The restrictor is arranged by forming or locating a circumferential, axial projection on the valve piston or the disk valve in such a way that the valve piston or the disk valve encloses the projection at least partially and at least at the start of a braking operation. This affords an additional, radial air gap between the projection and the valve piston or the disk valve, which effectively prevents an undesirably large air flow.

In one development the radial passage area of the air gap may be designed to vary as a function of the lift, varying along at least a portion of the lift of the valve piston.

In various embodiments, for example, an outside diameter of the radial outer face of the projection may be formed larger at its base than at its tip; moreover its radial outer face may be formed in a variety of ways, for example conical, convex, concave or complex.

Furthermore, the projection may be of elastic design, so that it can be deformed by flow-induced pressure ratios in the air gap.

Through design modification and adaptation of the outer face profile, the projection and its axial and radial extent or also its elasticity, it is possible to decisively influence the variation in the passage area of the air gap between the valve piston and the disk valve over the lift travel. Thus, it is possible by design means to purposefully influence the dynamic and noise behavior.

Through a design modification of the existing components and by avoiding additional components, the brake booster can be produced at no additional cost compared to the known state of the art.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

DESCRIPTION OF FIGURES

The present disclosure will become more fully understood from the detailed description and the accompanying drawings, wherein.

DETAILED DESCRIPTION

Figure 1:
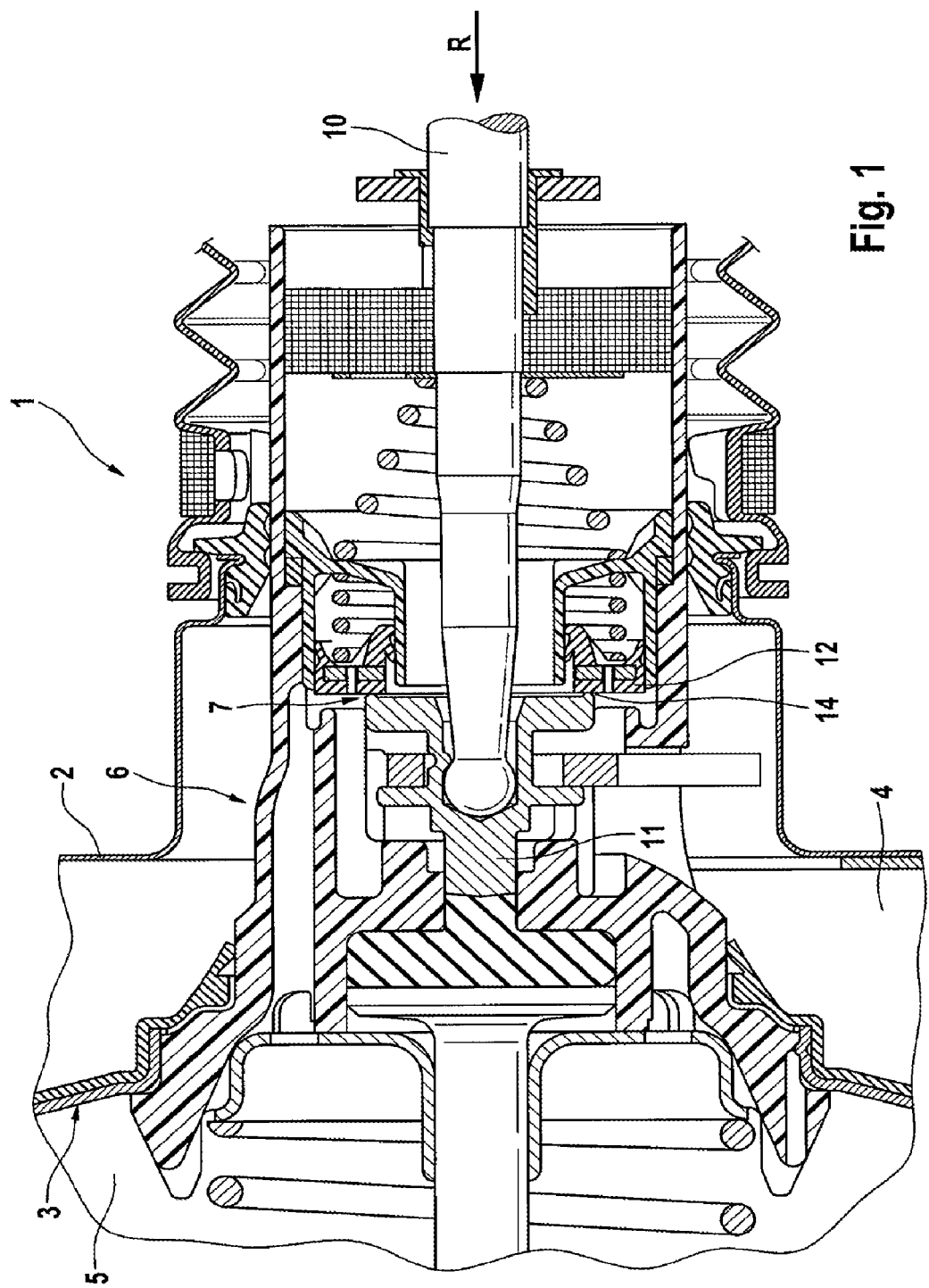
FIG. 1 shows a partial section through a control housing of a known brake booster of generic type.

FIG. 1 shows a known design of an unimproved pneumatic brake booster 1 for motor vehicles in a return position. A vacuum chamber 5 and a working chamber 4, which are separated from one another in a pressure-tight manner by a movable wall 3 but which can be connected by a system of air ducts in the control housing 6, are arranged in an interior space of the booster housing 2.

The invention system operates in exactly the same way for a tandem brake booster (not shown), in which the number of working and vacuum chambers is correspondingly doubled.

The air connection between the two chambers and the atmosphere and therefore the pressure differential between the chambers is controlled by the control valve 7, which opens and closes the individual air connections.

The control valve 7 contains a disk valve 12 having an elastically endowed surface and a valve piston 11, which with a sealing area 14 bears on the disk valve 12 and thereby prevents an air connection between the atmosphere and the working chamber 4, particularly in the initial, unactuated state prior to a braking operation.

Actuated directly by the driver or actuated automatically independently of the driver, a piston rod 10 displaces the valve piston 11 in the lift direction R and thereby defines its lift travel or the opening lift.

Largely the same pressure prevails in both chambers prior to a braking operation. When the valve piston 11 is displaced by a certain lift travel, the sealing area 14 is lifted off from the disk valve 12 and exposes an air connection between the working chamber 4 and the atmosphere, so that an air flow is established between the valve piston 11 and the disk valve 12, until the air connection is cut off again.

If the valve piston 11 is lifted off too rapidly or too far from the disk valve 12, the pressure gradient may abruptly assume such high values that oscillations and unwanted noises occur.

Figure 2:
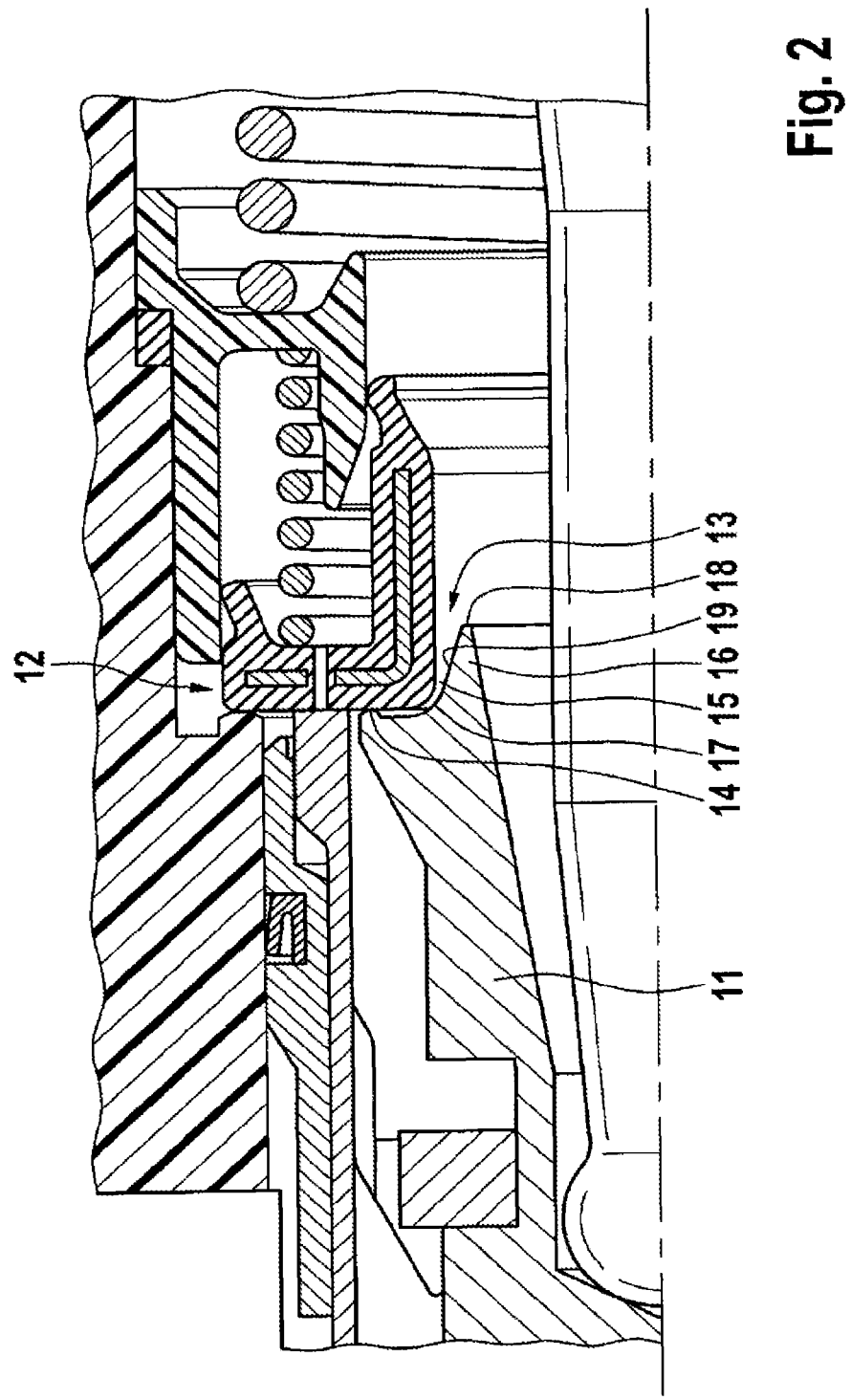
FIG. 2 shows a detailed section through the control valve of a first embodiment according to the invention.

FIG. 2 shows a detailed section through the control valve of a first embodiment of the brake booster 1 according to the invention. As already described above, in the unactuated state the seat between the valve piston 11 and the disk valve 12 is closed by the sealing area 14. On the actuation of a brake pedal, for example, a gap is opened between the valve piston 11 and the disk valve 12 which is dependent upon the speed of actuation and which allows the atmospheric pressure to flow into the working chamber 4.

A circumferential, axial projection 16, which in the unactuated state is radially enclosed from outside by the disk valve 12 and which forms an air gap 15 between the two components, is formed on the valve piston 11.

The projection 16 here is formed extending radially inwards and axially in the direction of the disk valve 12, concentrically with the sealing area 14. Here the projection 16 is preferably of continuous design, although for certain applications it is feasible, without departing from the scope of the invention, also to furnish it with axial slots, notches or radial grooves in order to influence the air flow in the air gap 15.

The passage area of the air gap 15 is at first increased slowly in the event of smaller degrees of lift of the valve piston 11, thereby allowing more precise regulation of the braking operation.

As the opening lift increases, the projection 16 is pushed fully out of the disk valve 12, so that in the event of full or emergency braking, for example, the air flow is able to pass unimpeded, thus ensuring the necessary dynamics.

The embodiment of the projection 16 depicted has a conical, radial outer face 19. The outside diameter of the outer face 19 is significantly greater at the base 17 of the projection 16 than at its tip 18.

Other shapes of the projection 16, not shown here, are also feasible, however, without departing from the scope of the invention. Through the design configuration of the dimensions of the projection 16, for example its axial and radial extent, the diameter at the base 17 and at the tip 18 and in particular the shape of the outer face 19, it is possible to tailor the size of the passage area of the air gap 15 along the lift of the valve piston as required.

For example, a continuous enlargement, a constant maintenance or even a reduction of the air gap 15 can be implemented over the lift travel of the valve piston 11, thus achieving the desired influencing of the pressure gradient.

Without departing from the scope of the invention, the outer face 19 may be not only conical, as shown, but also convex, concave or complex according to a functional profile (for example parabolic).

Use of the projection 16 produces a restrictor 13, which particularly at the start of braking, with small degrees of lift of the valve piston 11, reduces the air flow between the two components and prevents an excessively high pressure gradient.

Figure 3:
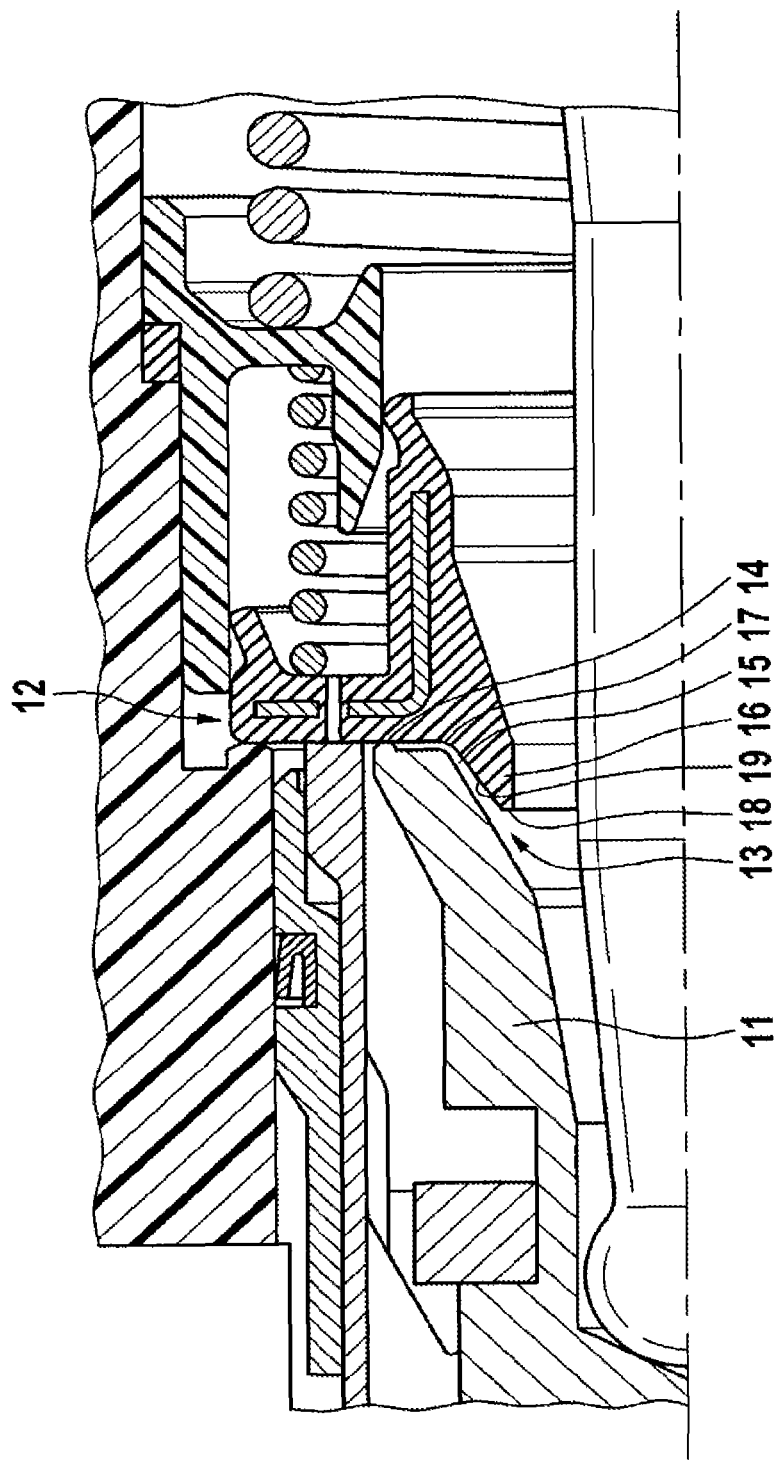
FIG. 3 shows a detailed section through the control valve of a further embodiment according to the invention.

FIG. 3 shows a detailed section through the control valve of a further embodiment of the brake booster 1.

Fundamentally the same working and design principles apply here as in the embodiment described above. In contrast to the latter, however, the projection 16 is arranged on the disk valve 12, so that in the initial, unactuated state it extends into the valve piston 11 and is radially externally enclosed by the latter.

Since the disk valve 12 is composed at least in part of an elastic material, a projection 16 formed onto the former may additionally be designed so that it is elastically deformable both radially outwards and radially inwards as a function of the flow ratios in the air gap 15.

Thus, for example, a particularly high air velocity and therefore a high vacuum in the air gap 15 would cause a deformation of the projection 16 radially outwards, a resulting reduction of the passage area of the air gap 15 and therefore a virtually automatic regulation.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

What is claimed is:

1. A pneumatic brake booster for motor vehicles comprising:
   a booster housing defining an interior space which is subdivided into at least one working chamber and at least one vacuum chamber by at least one axially movable wall which is exposed to a pneumatic differential pressure;
   a control housing;
   a control valve arranged in the control housing, wherein the control valve controls the pressure differential between the working chamber and the vacuum chamber, and which controls an air flow between the working chamber and one of the vacuum chamber and a surrounding atmosphere;
   wherein the control valve comprises a disk valve and with a valve piston, which can be joined by a sealing area to the disk valve to form a seal and is displaceable in a lift direction R; and
   a restrictor provided between the valve piston and the disk valve for restriction of the air flow as a function of the lift;
   wherein a circumferential, axial projection is formed on one of the valve piston and the disk valve to at least partially radially enclose the projection, such that a radial air gap exists between the projection and the one of the valve piston and the disk valve,
   wherein the projection is formed on the disk valve,
   wherein the projection is of elastic design, such that it can be deformed by flow-induced pressure ratios in the air gap during braking.

2. The pneumatic brake booster of claim 1, wherein a radial passage area of the air gap is variable as a function of the lift, wherein said area varies along at least a portion of the lift of the valve piston.

3. The pneumatic brake booster of claim 1, wherein an outside diameter of a radial outer face of the projection is formed larger at a base of the projection than at its tip.

4. The pneumatic brake booster of claim 3, wherein the radial outer face of the projection is conically shaped.

5. The pneumatic brake booster of claim 3, wherein the radial outer face at the projection is convexly shaped.

6. The pneumatic brake booster of claim 3, wherein the radial outer face of the projection is concavely shaped.

7. The pneumatic brake booster of claim 1, wherein the projection is formed on the valve piston.

\* \* \* \* \*